United States Patent [19]

Huber

[11] 4,344,093

[45] Aug. 10, 1982

[54] DELAY AND OPTIMUM AMPLITUDE EQUALIZERS FOR A READBACK CIRCUIT

[75] Inventor: William D. Huber, San Jose, Calif.

[73] Assignee: Sperry Corporation, New York, N.Y.

[21] Appl. No.: 200,365

[22] Filed: Oct. 24, 1980

[51] Int. Cl.³ .......................... G11B 5/09; G11B 5/02
[52] U.S. Cl. ........................................ 360/45; 360/67
[58] Field of Search ............... 360/65, 45, 46, 39, 360/67

[56] References Cited

U.S. PATENT DOCUMENTS 4,264,935 4/1981 Lee ........................................ 360/45
4,276,573 6/1981 Halpern et al. ...................... 360/45

Primary Examiner—Vincent P. Canney
Attorney, Agent, or Firm—Eugene T. Battjer

[57] ABSTRACT

A pulse improvement circuit for a magnetic readback system produces a data representative signal having symmetrical, equal-amplitude pulses of limited time widths. The circuit includes an equalizer made in accordance to a final transfer function produced as a result of a mathematical convolution of first and second transfer functions. The first transfer function is based on the theory of a matched filter for receiving a signal having data representative and non-white noise pulses contained therein to produce a filter signal having maximum signal to noise ratio. The second transfer function is based on the theory of a Papoulis window function for slimming the pulses contained in the filter signal. A specific circuit implementation of the final transfer function is an eight-pole, inductor-capacitor, ladder network for amplitude equalization coupled to an inductor-capacitor, lattice network including first and second order sections for phase equalization.

8 Claims, 14 Drawing Figures

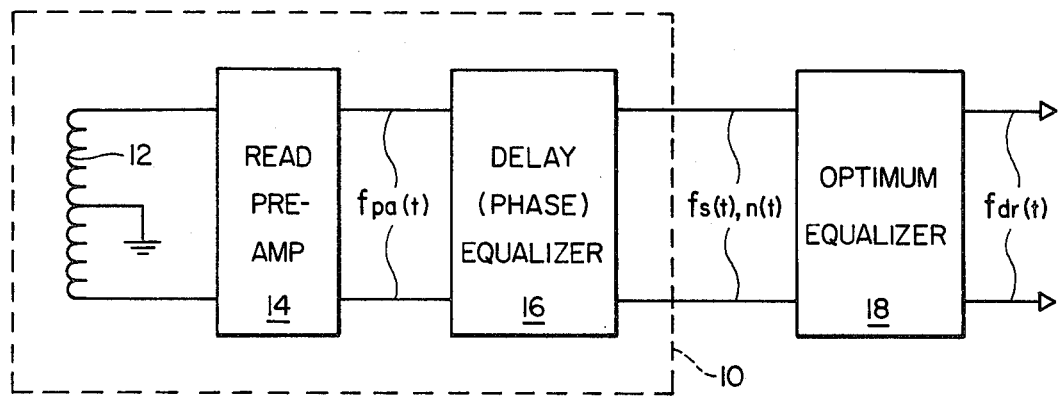
FIG._1
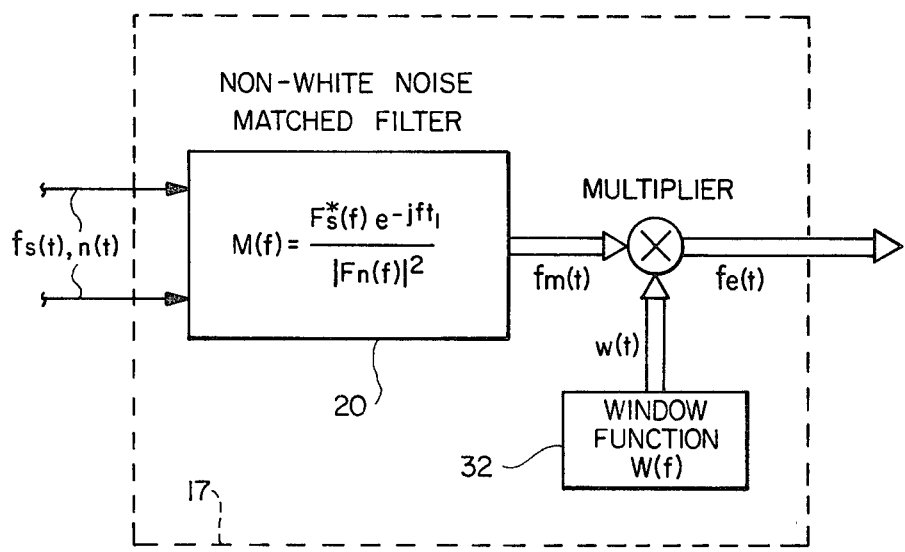
FIG._2

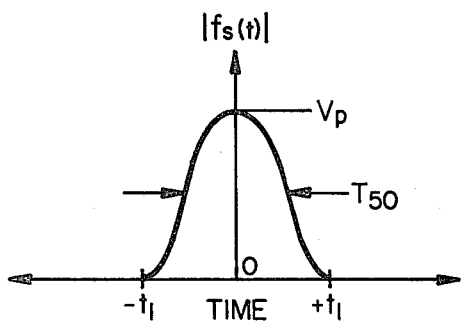
FIG_3A
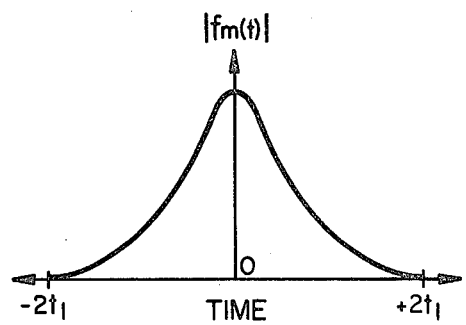
FIG_3B
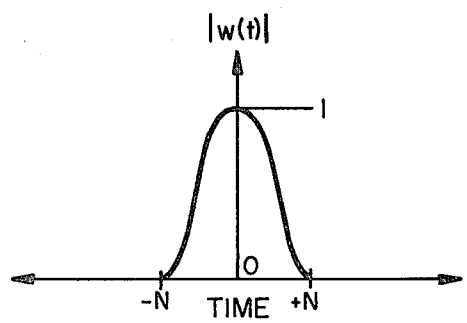
FIG_3C
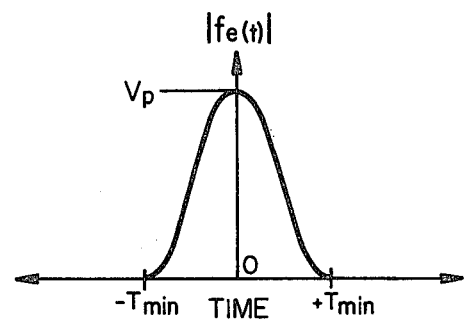
FIG_3D
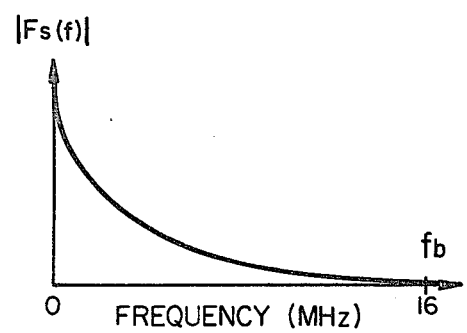
FIG_4A
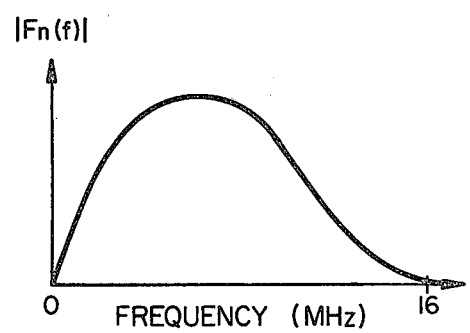
FIG_4B

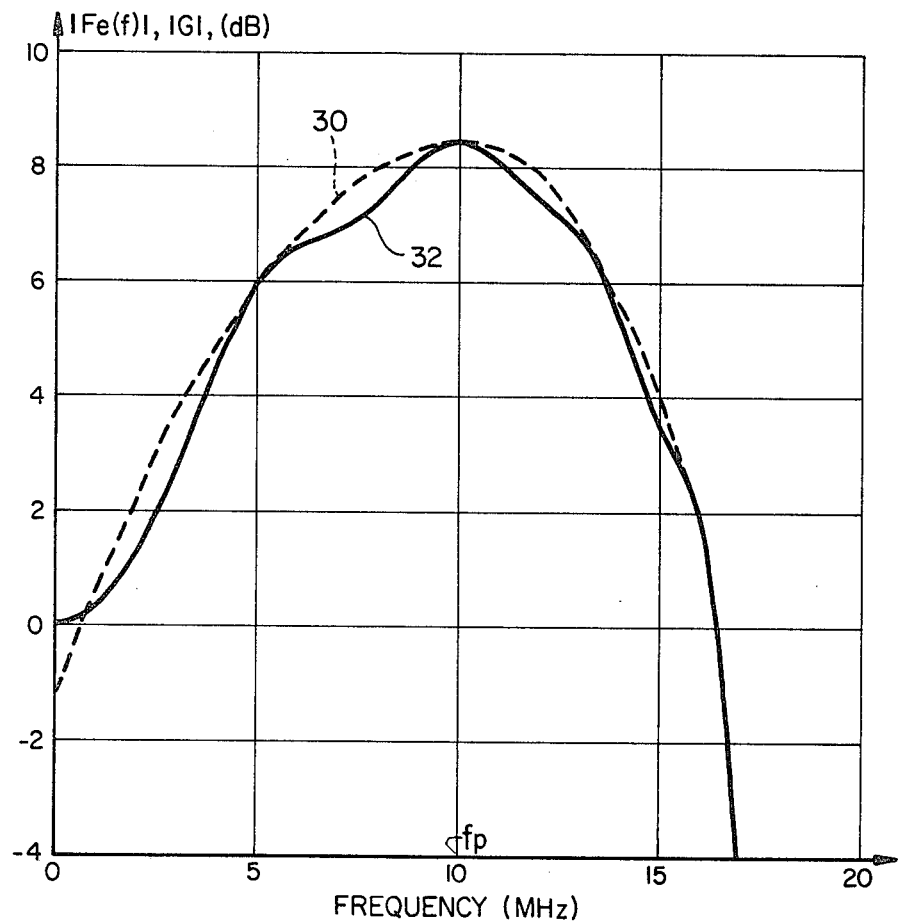
FIG_5
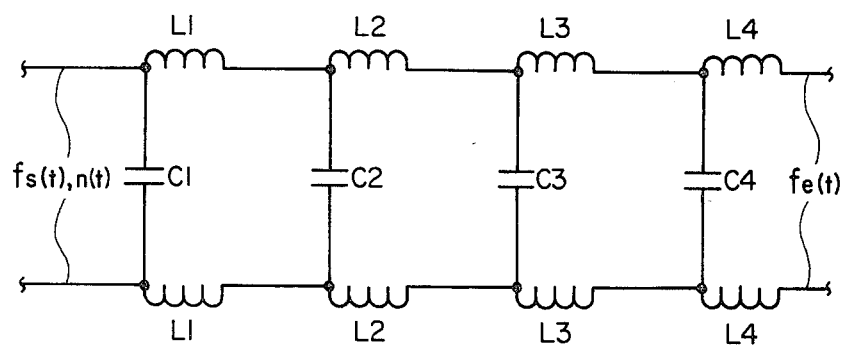
FIG_6

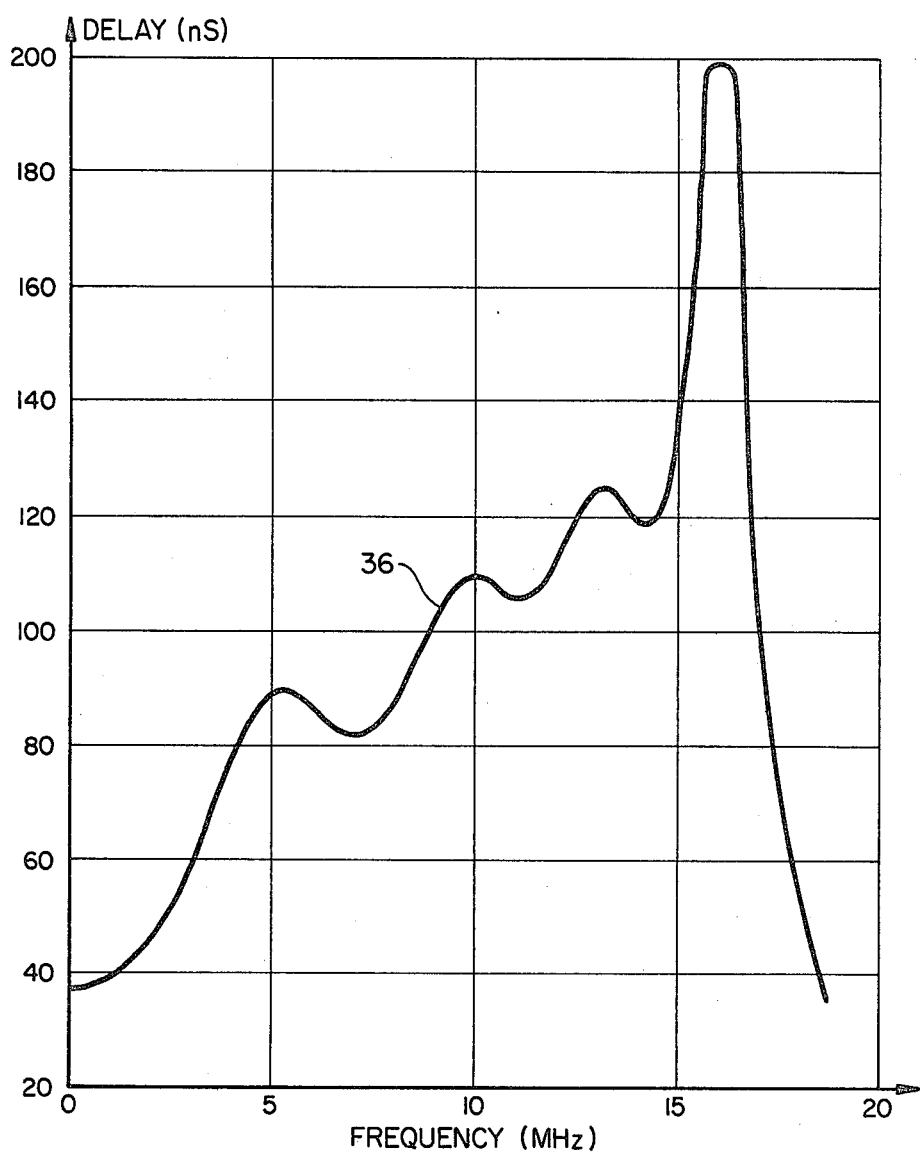
FIG_7
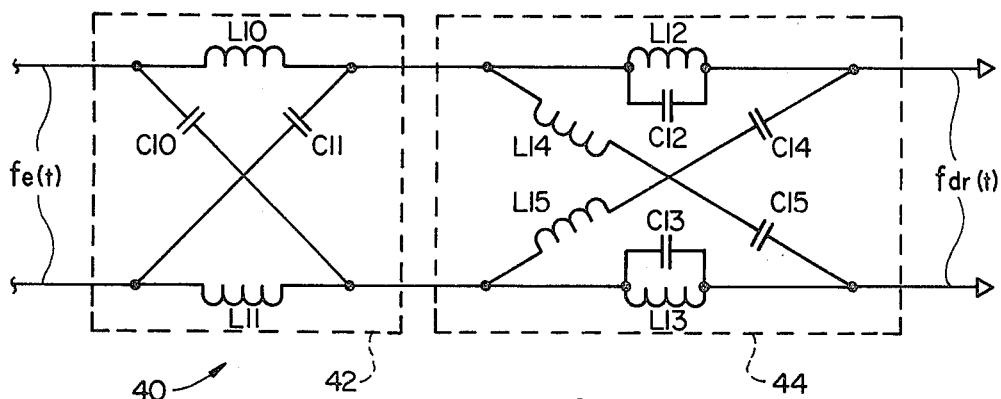
FIG_8

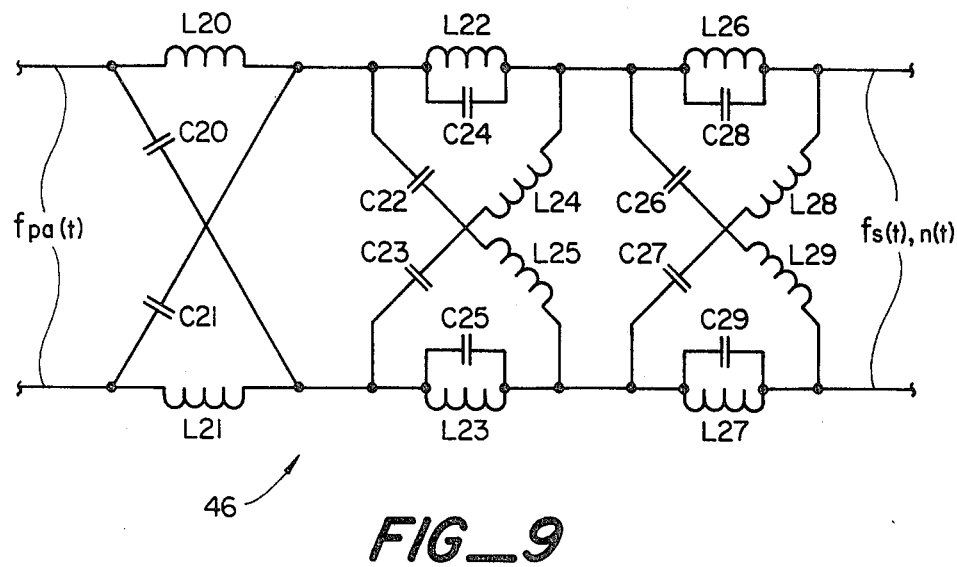
FIG_9
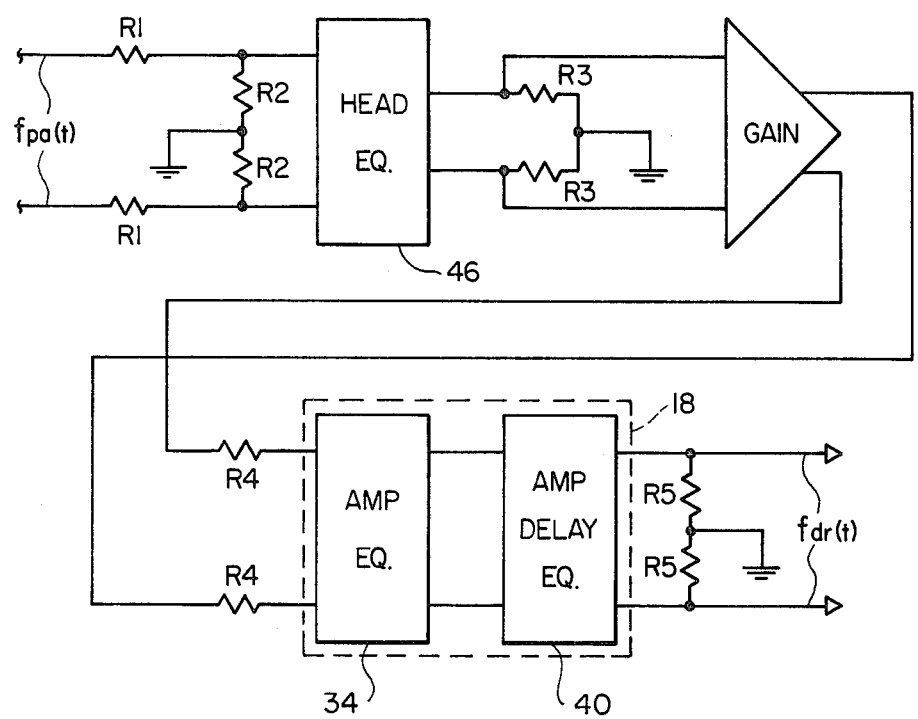
FIG_10

DELAY AND OPTIMUM AMPLITUDE EQUALIZERS FOR A READBACK CIRCUIT

BACKGROUND OF THE INVENTION

1. Field of the Invention

This invention relates to binary signal detection circuits and more specifically to improvements therein for improving the signal to noise ratio and limiting the pulse widths of the detected signal. The invention is useful for various signal detection applications and particularly desirable for use in magnetic readback systems for high density magnetically recorded data.

2. Description of the Prior Art

Magnetic recording of binary data is customarily performed by effecting polarization changes or transitions in a magnetic storage medium. In order to increase the storage capacity for a given storage medium it becomes necessary to increase the data packing density, that is, the number of information bits recorded along a given track in a storage medium. To achieve this greater packing density, magnetic recording of the data is generally carried out by means of various encoding techniques that have been developed for the purpose of reducing the number of transitions per bit, or for a group of bits, while simultaneously assuring that the maximum interval between transitions remains short enough so that a self clocking capability can be maintained for the recovery of the data when reading from the storage medium. Nevertheless, if the transitions become too closely spaced as a consequence of unduly high packing density, so called pulse crowding occurs because of inherit features of the magnetic recording and reading process. Pulse crowding is manifested in the course of reading from the storage medium by interference between read pulses arising from adjacent transitions. This interference occurs because the read pulses overlap in time to some degree when the transitions are too closely spaced and it is aggravated by asymmetry and phase distortion of the read pulses. The phase distortion results from differential phase shifts of the constituent frequency components of the signal which cause broadening of the individual pulses. It is well known in the magnetic data storage art, however, that the read pulses supplied from a magnetic read head typically contain such distortion and accordingly various techniques have been developed in the art to provide compensation therefor. Suitable phase shift compensation may be provided, for example, by the use of phase equalization means as disclosed in U.S. Pat. No. 3,405,403 issued Oct. 8, 1968 to G. V. Jacoby, et al. As becomes apparent, peak shift is undesirable inasmuch as the peaks are representative of the data transitions recorded on the storage medium. In any event, even in the absence of such distortion and asymmetry or the provision of compensation therefor, if the read pulses overlap due to pulse crowding, interference will occur between adjacent pulses causing variable amplitude and shifting of the peaks of the read signal. The foregoing shifting of pulses, so called bit shift or peak shift, causes resultant errors either as a consequence of failure to detect a transition indicative of a data bit or false interpretation of noise in the read signal as representative of a data bit. For accurate signal detection the relative time occurrence of the peaks must be preserved in order to recover the data. It is, therefore, common practice in the magnetic data storage art to provide some sort of compensation or equalization which acts to narrow the widths of the individual read pulses so that they do not appreciably overlap and thus do not cause intolerable peak shift or amplitude variation of the read signal. The present invention is concerned with read signal equalization. Hence, the remaining consideration of the prior art section of this description will be limited generally to that technique and discussed ultimately in relation to a particular signal detector circuit which is improved by means of the principles of the present invention.

As mentioned above, data recovery pursuant to reading from a magnetic storage medium is typically performed by sensing the occurrence of peaks of the read signal, and it is for that reason that provision is made for narrowing the read pulses so as to preclude interference therebetween which otherwise might intolerably shift the peaks. Additional factors attendant to pulse narrowing and which affect data recovery must also be considered. For instance, the more a pulse is narrowed the greater its bandwidth becomes thus requiring a substantially commensurate increase of the read system bandwidth with an accompanying increase in noise. This is undesirable because noise which is at or near the peak of a read pulse can act to shift the peak of the pulse, so called noise induced peak shift. It is, therefore, important to provide equalization which appropriately acts on the relatively broad read pulses so as to provide a degree of pulse narrowing sufficient to eliminate or at least substantially reduce interpulse interference, whereby peak amplitude variation and bit shift are satisfactorily avoided. But the pulse narrowing must not be so great as to substantially increase noise in the read system. To obtain this result, the individual read pulses should be narrowed so as to have a contained amplitude spectrum, that is, a spectrum of limited frequency range. The point is that since bit shift can be cause by both interpulse interference and noise, a trade off should be made with regard to pulse narrowing which has the effect of advantageously reducing interpulse interference but which unfortunately enhances noise.

A typical equalizer circuit is disclosed in U.S. Pat. No. 4,081,756 issued Mar. 28, 1978 to Price et al and assigned to the assignee of the instant invention. The preferred form of the equalizer disclosed therein provides even-function and preferably substantially cosine-forth-power amplitude spectrum shifting. In other words, the equalizer responds to an isolated time domain pulse input so as to provide isolated a time domain pulse output having a substantially cosine-fourth-power amplitude spectrum in the frequency domain. With even-function amplitude spectrum shaping and other so called forced amplitude spectrum output shaping techniques, each shaping technique serves to compensate the variable peak amplitude input signal which is derived by the transducer and is applied to the equalizer so as to transform the input signal into a constant peak amplitude output signal having narrowed pulses and a prescribed amplitude spectrum of limited frequency range. It should be understood that all such read signals have data and noise components. The forced amplitude spectrum output shaping technique has inherent in its process predetermined the desirable output shape to be produced by the equalizer in response to the read signal. However, the noise component of the desired (output shape) signal can be altered in only a limited way, that is, by pulse narrowing wherein the relatively broad read pulses are narrowed sufficiently to at least substantially reduce interpulse interference. But the pulse narrowing is dictated by the desired output shape and must not be so great as to unduly increase noise in the read system and thus produce noise induced peak shifts. For a pulse type signal, the signal to noise ratio is a quantitative measure of a signal having data and noise components. The maximum signal to noise ratio for pulses produced by forced amplitude spectrum output shaping is inherently limited by the predetermined shape such as a cosine-fourth power spectrum for the output pulses made in response to the input read signal. Therefore, although the equalizer described above is quite useful there is a need for a better equalization by improving the signal to noise ratio of the read signal in order that the pulse peaks representative of the data may be detected with less uncertainty.

SUMMARY OF THE INVENTION

The above mentioned limitations of equalizer circuits, made in accordance with the forced amplitude spectrum output shaping, are overcome by the provision of a new and improved readback circuit. This readback circuit includes a transducer circuit for detecting data recorded on the magnetic medium and an optimum equalizer circuit connected to the output of the transducer circuit. The optimum equalizer circuit produces a data representative signal having symmetrical, equal amplitude pulses of limited pulse widths and a signal to noise ratio greater than the signal to noise ratio of the input read signal produced by the transducer circuit. The transducer circuit operates in a conventional manner to detect the magnetic transitions recorded on the storage medium and to produce a voltage signal of varying amplitudes. However, since the transducer typically has a nonlinear phase delay which will produce a read signal of asymmetrical shape, a capacitor-conductor lattice network, which is a well known circuit for a delay equalizer, is provided to compensate for the nonlinear phase delay.

The optimum equalizer circuit is made in accordance to a final transfer function produced as a result of a mathematical convolution of two frequency domain transfer functions. The first transfer function is based on the theory of a matched filter. If the optimum equalizer embodied only matched filter theory, such equalizer would operate to change the read signal produced by the transducer circuit into a signal which has pulses having maximum signal to noise ratio. The first transfer function is specifically derived with inputs comprising a known input data signal, which in this case is assumed to be pulses having Lorentzian waveshapes, and a colored noise input signal. The second transfer function is based on the theory of a window function which in the preferred embodiment of the optimum equalizer circuit is a Papoulis window function. If the optimum equalizer embodied only window function theory, such equalizer would operate to produce a signal with limited pulse widths. The transfer function resulting from the convolution of the matched filter and Papoulis window functions is actually implemented by a passive inductor-capacitor, balanced ladder network. The preferred embodiment of the balanced ladder network is an eight pole filter. However, although the ladder network has a response which closely approximates the amplitude response of the transfer function it also introduces a nonlinear phase delay. Accordingly, a second delay equalizer is included to compensate for the nonlinear phase delay of the ladder network. In the preferred embodiment the second delay equalizer is implemented by an all pass lattice network which comprises capacitor inductor sections cascaded together. As a result of the above arrangement, the input read signal when applied to the equalizer circuit included in the present invention will be transformed into a data representative signal which has improved signal to noise ratio performance and limited pulse widths.

The features and objects of the present invention will be better understood in view of the following detailed description of the preferred embodiment given with references to the appended drawings.

BRIEF DESCRIPTION OF THE DRAWINGS

FIG. 1 is a block diagram of a readback circuit incorporating the preferred embodiment of the present invention.

FIG. 2 is a block diagram useful for explaining and understanding an equalizer which is incorporated in the present invention.

FIG. 3A is plot of the waveshape of an isolated Lorentzian pulse.

FIG. 3B is a plot of the output pulse produced by the matched filter portion of the present invention in response to the isolated Lorentzian pulse depicted in FIG. 3A.

FIG. 3C is a time domain plot of the Papoulis Window function that is used in the amplitude equalizer portion of the present invention.

FIG. 3D is a plot of the waveshape of the data representative pulse produced at the output of the present invention in response to the isolated Lorentzian pulse shown in FIG. 3A.

FIG. 4A is a plot of the amplitude power spectrum (Fourier transform) of the isolated Lorentzian pulse depicts in FIG. 3A.

FIG. 4B is a plot of the amplitude power spectrum (Fourier transform) of the noise signal component of the signal inputted to the matched filter portion of the present invention.

FIG. 5 depicts the amplitude power spectrum for the final transfer function of the amplitude equalizer portion of the present invention and the amplitude power spectrum of the actual circuit embodiment of the amplitude equalizer of the present invention.

FIG. 6 is an electrical schematic of the amplitude equalizer portion of the present invention.

FIG. 7 is a plot of the delay distortion of the amplitude equalizer circuit depicted in FIG. 6.

FIG. 8 is an electrical schematic of the delay equalizer for compensating the delay distortion of the amplitude equalizer circuit depicted in FIG. 6.

FIG. 9 is an electrical schematic of the delay equalizer for compensating the delay of inherent in the read head portion of the present invention.

FIG. 10 is a block diagram and electrical schematic depicting the assembly of the circuits shown in FIGS. 6, 8 and 9.

DETAILED DESCRIPTION OF THE PREFERRED EMBODIMENT

Illustrated in FIG. 1 is a block diagram of a readback circuit incorporating the preferred embodiment of the present invention. Detection circuit 10 comprises read head 12 coupled to preamplifier 14 and is identical in overall operation with the corresponding elements described in the afore-mentioned U.S. Pat. No. 4,081,756 to Price et al. Read head 12 when in operating position is disposed adjacent a moving magnetic medium (which is not shown) to sense the polarity reversals recorded therein and to produce read signals. The signal produced by preamplifier 14 is then transmitted to delay (phase) equalizer 16 which functions to compensate for a nonlinear phase delay. Read head phase delay is well known in the prior art and is discussed, for example, in U.S. Pat. No. 3,516,066 issued June 2, 1970 to G. Jacoby. The output of delay equalizer 16 is a read signal (a train of pulses having data and noise components) which is transmitted to optimum equalizer 18. Optimum equalizer 18 operates on the read signal pulses to produce a data-representative, pulses type signal comprising a sequence of equal amplitude, symmetrical pulses having well defined peak amplitudes and limited pulse widths so that interpulse interference is essentially eliminated.

In the preferred embodiment of the present invention, optimum equalizer 18 is an electrical circuit implementation which approximates a final transfer function which has been derived as a result of a mathematical convolution of first and second frequency domain transfer functions. In order to facilitate the explanation of optimum equalizer 18 and to aid in the appreciation and understanding thereof, it is desirable to consider the following discussion of the mathematical procedure for deriving the final transfer function for optimum equalizer 18.

Illustrated in FIG. 2 is the block diagram of an equalizer 17 as described theoretically in mathematical functions. The aforementioned first transfer function of optimum equalizer 18 includes non-white noise matched filter 20 of equalizer 17. A mathematical treatise of a matched filter similar to matched filter 20 of the present invention is given in the book entitled *Communication System Principles* by P. Z. Peebles, Jr., Addison-Wesley Publishing Company, Copyright 1976, Section 4.12. That treatise formally derives the optimum frequency domain transfer function for a matched filter responding to an input signal which is similar to the read signal produced at the output of delay equalizer 16 and applied to the input of equalizer 17. In the present case and as shown in FIG. 2, $f_s(t)$ and $n(t)$ are applied to the input of matched filter 20 and are respectively the data and noise signals produced at the output of delay equalizer 16. When the results of the aforementioned treatise by Peebles is applied to this case, transfer function $M(f)$ (first transfer function of optimum equalizer 18) of matched filter 20 is (in the frequency domain):

$$M(f) = \frac{F_s^*(f) e^{-jft_1}}{|F_n(f)|^2}$$

where f is a frequency variable, $F_s^*(f)$ is the complex conjugate of the Fourier transform of $f_s(t)$, $F_n(f)$ is the fourier transform of $n(t)$, and $t_1$ is a constant to be explained later in connection with FIG. 3A. The exponential term of $M(f)$ is a constant time delay term which is required because a physical circuit implementation of $M(f)$ cannot produce an output instantaneously in response to an input. Therefore, the exponential term helps to make $M(f)$ physically realizable.

It can be shown that signal $f_s(t)$ is characterized as a sequence of Lorentzian pulses which can mathematically be represented as;

$$f_s(t) = V_p/(1 + (2t/T_{50})^2)$$

where t is a time variable, $V_p$ is the peak amplitude in volts, and $T_{50}$ is the time duration (pulse width) of an isolated pulse at the level of half peak amplitude. FIG. 3A depicts an isolated Lorentzian pulse in the time domain. It should be noted that $t_1$ shown in FIG. 3A is the base line width of the isolated Lorentzian pulse at zero amplitude. The Fourier transform of $f_s(t)$ is depicted in FIG. 4A limited to the bandwidth of an illustrative readback circuit used to explain this case. The Fourier Transform of noise function $n(t)$ is determined empirically and is depicted in FIG. 4B for the bandwidth of the presently illustrated case.

After the Fourier transforms of $f_s(t)$ and $n(t)$ functions have been determined by calculations and/or by empirical methods, transfer function $M(f)$ for matched filtered 20 can be found. It should be noted that quantitative values have been included in the following discussion for illustrative purposes to aid in understanding and explaining the operation of the present invention, and that such illustrative values do not limit the preferred embodiment of the present invention as will be apparent. Matched filter theory was chosen for the transfer function $M(f)$ because the circuit embodying a matched filter produces in response to an input signal, (comprising data and noise pulse components) matched filter pulses each of which was maximum signal to noise ratio so as to reduce peak shifting (caused by the noise) and thereby to reduce the errors in locating the pulse peaks that are indicative of the data. However, the matched filter has an undesirable feature in that the pulses from the matched filter each has a time duration (pulse width) essentially twice the time duration of the respective input signal pulses. In other words, in order for matched filter 20 to maximize the signal to noise ratio of the input signal pulses the bandwidth of each pulse of the input signal is reduced. The bandwidth is reduced only that amount needed to achieve maximum signal to noise ratio performance, but unfortunately, reduced bandwidth also results in wide matched filter pulses. in modern disk drives with high density recordings, such wide pulses will be closely interspaced resulting in undesirable pulse interactions which act to shift pulse peaks and degrade peak amplitudes.

Accordingly, the unacceptably wide pulses produced by matched filter 20 must be slimmed. As shown in FIG. 2, the slimming of each pulse of matched filter signal $f_m(t)$ is accomplished by multiplication with window function 32. Window functions are known in the digital (discrete) data processing art wherein an analog input signal, such as that produced by detector circuit 10 is sampled at some sampling frequency. A drawback of the sampling technique is that the power amplitude spectrum in the frequency domain of the reconstructed pulse produced in response to a sampled isolated input pulse is duplicated at multiples of the sampling frequency. Therefore, if the input signal comprises a sequence of pulses which are to be sampled the reconstructed output pulses will interfere with one another thereby lessening the reliability of detecting the data content of the input signal. Window functions serve to contain in the time the reconstructed pulse so that only one reconstructed pulse is produced in time while the other multiple pulses are supressed. In the present case, signal $f_m(t)$ is an analog signal but a window function was applied to slim appropriately each pulse of signal $f_m(t)$. In the preferred embodiment a Papoulis window function was used instead of other known window functions such as Hamming or Parzen window function because a circuit embodying a Papoulis window function operates to produce a signal $f_e(t)$ which has the least mean square difference between the power amplitude spectrum (in the frequency domain) of the input signal $f_m(t)$ and that of $f_e(t)$ than produced by any other window function. The Papoulis window function is discussed in the article by Athanasios Papoulis entitled "Minimum Bias Windows for High-Resolution Spectral Estimates", IEEE Transactions on Information Theory, Volume IT-19, Number 1, January 1973. A formal derivation and explanation is presented therein as to the advantages of the Papoulis window function over other known window functions. Briefly described, the Papoulis window function W(t) is described mathematically as:

$$W(t) = \frac{1}{\pi} \left| \sin\left(\frac{\pi t}{N}\right) \right| + \left(1 - \frac{|t|}{N}\right) \cos\left(\frac{\pi t}{N}\right)$$

here N is a time constant, and t is a time variable constrained such that t is greater than or equal to $-N$ and less than or equal to $+N$. In order to better understand the function W(t), a plot of W(t) in the time domain is depicted in FIG. 3C. In the case of a specific disk drive memory system, the maximum amplitude of W(t) is one (that is, unity gain amplification) and N is chosen slightly larger than $T_{min}$ which is the minimum time interval between two consecutive isolated pulses detected by read head 12. In the illustrative case, N is equal to 85 nanoseconds (ns) and $T_{min}$ is equal to 80 ns. As shown in FIG. 2, the final output of optimum equalizer 18 after multiplication by window function W(t) is signal $f_e(t)$. It can be shown mathematically that the product of two time functions (that is, $f_m(t)$ multiplied by W(t)) is equivalent to the mathematical convolution of the respective Fourier transforms of each of the time functions. A discussion explaining convolutions and Fourier transforms is disclosed by R. Bracewell in his book *Fourier Transforms and Applications*, McGraw-Hill Book Company, New York, copyright 1965. The Fourier transform of $f_m(t)$ can be determined because the Fourier transform of input signals $f_s(t)$ and $n(t)$ are known so that the Fourier transform of the output of matched filter 20 can then be derived. Since the above referenced Papoulis article discloses the Fourier transform of the Papoulis window function W(t), the mathematical convolution of the two Fourier transforms of $f_m(t)$ and W(t), can then be calculated. Accordingly, the transfer function for optimum equalizer 18 can then be determined by taking the Fourier transforms of $f_e(t)$ and dividing it by the Fourier transforms of the known input signals $f_s(t)$ and $n(t)$. This transfer function for optimum equalizer 18 is the above mentioned final transfer function which is denoted (in the frequency domain) as $H_{OE}(f)$. FIG. 5 depicts the power amplitude spectrum of $H_{OE}(f)$ normalized to the frequency $f_p$ which is the frequency at which the magnitude of function $H_{OE}(f)$ is at a maximum. Line 30 on FIG. 5 therefore represents a plot of the amplitude frequency response desired for an electrical circuit which is to embody the theories of a matched filter and a Papoulis window function.

The electrical circuit implementation of a specified transfer function is generally disclosed in a book by G. C. Temes and J. W. La Patra entitled *Introduction to Circuit Synthesis and Design*, McGraw-Hill Book Company, New York, copyright 1977. Briefly described, the process involves the curve fitting of a polynomial to the transfer function of optimum equalizer 18 (as represented by curve 30) such that the difference in amplitude between the polynomial curve and the transfer function curve 30 are within some specified error criterion such as least mean square. The order of the polynomial (that is, the number of roots which makes the polynomial equal to zero) is determined from a tradeoff between the complexity of the electrical circuit required and the error criterion. In other words, as the number of roots increase the complexity of the resulting electrical circuit implementation also increases so that a tradeoff exists between electrical circuit complexity (with the attendant problems of reliability and added cost) and the error criterion which is used to measure the curve fit between the transfer function curve of the electrical circuit and the final transfer function curve desired for optimum equalizer 18.

Disclosed in the above mentioned Temes reference, is a method to produce an electrical circuit having inductor and capacitor (L-C) components once the polynomial roots have been determined. In the preferred embodiment of the present invention, a L-C network was chosen for implementation because that network contains passive elements and is therefore easier and less costly to make than other networks such as delay line circuits having active elements. In the actual application of the disclosed process to produce a L-C circuit embodiment, the polynomial representative of the transfer function is G(f) (specified in the frequency domain so that the degree of matching with curve 30 can be graphically presented) and is written as a ratio of two polynomials. The numerator polynomial was chosen to be one and the denominator polynomial was a function to be varied so that G(f) matches curve 30 to some specified error criterion. The roots of the denominator function are known in the art as poles. In the preferred embodiment, the order of the denominator function was chosen to be eight which was empirically determined to produce the best fit to curve 30 when compared with four, six or ten pole solutions.

It should be noted that the poles of the denominator function are actually determined in the complex frequency plane and then the coefficients of each pole are then chosen so that the normalized magnitude plot of G(f) will closely match curve 30 to the specified error criterion. Once the poles of the denominator function have been properly specified, the component values of the L-C network implementation can then be specified in accordance to the teachings of the aforementioned Temes reference. Circuit 34 as depicted in FIG. 6 is one circuit implementation of a part of the present invention and operates to produce signal $f_e(t)$ in response to the applied signal comprising $f_s(t)$ and $n(t)$. It should be further noted that curve 32 in FIG. 5 represents the normalized amplitude spectrum for circuit 34. Circuit 34 differs from the theoretically determined circuit dictated by the poles of G(f) because circuit 34 was made with components having standard values (that is, components that are commercially available off the shelf and not custom made components). This arrangement was used because custom produced components are costly to produce. Furthermore, the normalized amplitude spectrum curve 32 of circuit 34 sufficiently matched curve 30 so that custom made components were not required.

A known undesirable feature of circuit 34 is the nonlinear phase (delay) distortion that circuit 34 produces in response to an input signal. Compensation for the, non-linear phase distortion of a circuit is well known in the prior art and several circuit configurations now available. A method for calculating the phase distortion for the G(f) is disclosed in the previously mentioned Temes reference. Curve 36 depicted in FIG. 7 is a plot of the delay (phase distortion) produced by circuit 34 in response to various frequencies. In the preferred embodiment, a lattice, all-pass network was used to compensate for the non-linear phase delay. The design and implementation of such lattice delay is well known and is disclosed, for example, in an article by H. Matthes entitled, "Designing High-Grade Delay Equalizers", NTZ-CJ, 1965, Number 4. Depicted in FIG. 8 is lattice delay equalizer 40 having 2 sections 42 and 44 used to compensate for the non-linear delay distortion of circuit 34. Delay equalizer 40 produces signal $f_{df}(t)$ in response to signal $f_e(t)$ produced by circuit 34. Therefore, in the preferred embodiment of the present invention optimum equalizer 18 (shown in FIG. 1) includes circuit 34 coupled to circuit 40.

As previously mentioned, delay equalizer 16 is used to compensate for the non-linear delay of read head 12. In the preferred embodiment, delay equalizer 16 is also a lattice, all-pass network and is depicted as circuit 46 in FIG. 9. The design techniques which were used to produce the circuit for delay equalizer 40 was also used to produce the circuit for delay equalizer 16 since the phase distortion characteristics of read head 12 are well known and can be empirically determined for any specified read head. Circuit 46 therefore receives signal $f_{pa}(t)$ (shown in FIG. 1) to produce signals $f_s(t)$ and $n(t)$.

FIG. 10 depicts in a block diagram and electrical schematic form a combined circuit including the circuits shown in FIGS. 6, 8 and 9. Circuit 46 is terminated at both ends with resistors equal to the characteristic impedance of circuit 46. Similarly, circuit 18 is terminated at both ends with resistors equal to the characteristic impedance of circuit 18. Such termination configurations are well known in the art and serve to reduce substantially the multiple signal reflections which arise when circuits are cascaded together.

One specific embodiment of the preferred embodiment of the present invention was made with the following listed values for the respective elements of circuits 34, 40 and 46.

| Inductors (in microHenry) | | Capacitors (in picoFarad) | | Resistors (in Ohms) | |
|---|---|---|---|---|---|
| L1 | 6.8 | C1 | 22 | R1 | 1000 |
| L2 | 2.2 | C2 | 62 | R2 | 62 |
| L3 | 1.5 | C3 | 91 | R3 | 62 |
| L4 | 0.68 | C4 | 100 | R4 | 1000 |
| L10 | 4.7 | C10 | 300 | R5 | 62 |
| L11 | 4.7 | C11 | 300 | | |
| L12 | 2.2 | C12 | 62 | | |
| L13 | 2.2 | C13 | 62 | | |
| L14 | 0.91 | C14 | 150 | | |
| L15 | 0.91 | C15 | 150 | | |
| L20 | 2.7 | C20 | 180 | | |
| L21 | 2.7 | C21 | 180 | | |
| L22 | 2.7 | C22 | 180 | | |
| L23 | 2.7 | C23 | 180 | | |
| L24 | 1.5 | C24 | 82 | | |
| L25 | 1.5 | C25 | 82 | | |
| L26 | 0.56 | C26 | 33 | | |
| L27 | 0.56 | C27 | 33 | | |
| L28 | 2.0 | C28 | 120 | | |
| C29 | 2.0 | C29 | 120 | | |

It should be understood that an alternative embodiment of the present invention comprises one delay equalizer to compensate simultaneously for the delay of readhead 12 and circuit 40.

While the invention has been described with reference to specific embodiments, it will be apparent that improvements and modifications may be made within the purview of the invention without departing from the spirit and scope thereof as defined in the appended claims.

I claim:

1. In a magnetic recording readback system, pulse improvement circuitry comprising in combination;
    transducer circuit means for producing signals which vary in pulse width to be greater and alternatively lesser than a predetermined time duration and each of which includes data characteristics, noise characteristics and a signal to noise ratio,
    equalizer means coupled to receive the output signals from said transducer circuit means implemented in accordance with a final transfer function wherein said final transfer function is a mathematical convolution of first and second transfer functions,
    said first transfer function comprising a matched filter function which enables said equalizer means to operate on said signals from said transducer circuit means to improve said signal to noise ratio thereof,
    said second transfer function comprising a window function which further enables said equalizer means to operate on said signals from said transducer circuit means to limit the pulse widths of said signals to be less than said predetermined time duration.

2. The circuitry of claim 1 wherein said window function comprises a Papoulis window function.

3. In a magnetic recording readback system, pulse improvement circuitry in accordance to claim 1 wherein said equalizer means comprises amplitude equalization means which produces signals having phase distortion, wherein there is further included in said equalizer means phase equalization means coupled to receive the signals from said amplitude equalization means,
    said amplitude equalization means having a ladder inductor-capacitor configuration and providing signals therefrom which have non-linear phase characteristics,
    said phase equalization means having a lattice inductor-capacitor configuration and formed to compensate for the non-linear phase characteristic of said amplitude equalizer means whereby the signals produced at the output of said equalizer means is delayed in time with a linear phase delay.

4. The circuitry of claim 3 wherein said equalization means is terminated in its characteristic impedance.

5. The circuitry of claim 1 wherein said transducer circuit means includes a read head and a delay phase equalization network, and wherein said delay phase equalization network is formed to compensate for non-linear phase characteristics in signals generated by said read head.

6. The circuitry in claim 5 wherein said delay phase equalization network is terminated in its characteristic impedance.

7. In a magnetic recording readback system, pulse improvement circuitry in accordance to claim 5 wherein said equalizer means which produces signals having phase distortion, wherein there is further included in said equalizer means phase equalization means coupled to receive the signals from said amplitude equalization means, said amplitude equalization means having a ladder inductor-capacitor configuration and providing signals therefrom which have non-linear phase characteristics, said phase equalization means having a lattice inductor-capacitor configuration and formed to compensate for the non-linear phase characteristics of said amplitude equalizer means whereby the signals produced at the output of said equalizer means in delayed in time with a linear phase delay.

8. The circuitry of claim 7 wherein said equalization means is terminated in its characteristic impedance.

* * * * *